United States Patent [19]
Abdul et al.

[11] Patent Number: 5,690,173
[45] Date of Patent: Nov. 25, 1997

[54] APPARATUS FOR ENHANCED BIOREMEDIATION OF UNDERGROUND CONTAMINANTS

[75] Inventors: Abdul Shaheed Abdul, Troy; Thomas Loughborough Gibson, Utica, both of Mich.

[73] Assignee: General Motors Corporation, Detroit, Mich.

[21] Appl. No.: 805,481

[22] Filed: Feb. 25, 1997

Related U.S. Application Data

[63] Continuation of Ser. No. 542,605, Oct. 13, 1995, abandoned.
[51] Int. Cl.⁶ .............................. E21B 43/01; B09B 3/00
[52] U.S. Cl. .................... 166/268; 166/305.1; 166/74; 405/128
[58] Field of Search .......................... 166/246, 370, 166/268, 269, 305.1, 73, 74; 405/128

[56] References Cited

U.S. PATENT DOCUMENTS

| | | | |
|---|---|---|---|
| 5,111,883 | 5/1992 | Savery | 166/269 |
| 5,221,159 | 6/1993 | Billings et al. | 405/128 |
| 5,332,333 | 7/1994 | Bentley | 405/128 |
| 5,360,067 | 11/1994 | Meo, III | 166/256 |
| 5,402,848 | 4/1995 | Kelly | 166/266 |
| 5,441,365 | 8/1995 | Duffney et al. | 405/128 |
| 5,520,483 | 5/1996 | Vigneri | 405/128 |
| 5,543,623 | 8/1996 | Everett et al. | 250/390.04 |
| 5,553,189 | 9/1996 | Stegemeier et al. | 392/422 |
| 5,577,558 | 11/1996 | Abdul et al. | 166/246 |

OTHER PUBLICATIONS

"Enhancement of Bioremediation Using Aeration Device," The Hazardous Waste Consultant, pp. 1.27–1.28 (Jan./Feb. 1995).

*Primary Examiner*—Frank Tsay
*Attorney, Agent, or Firm*—George A. Grove

[57] ABSTRACT

A method and apparatus for achieving in situ bioremediation of dissolved or dispersed organic contaminants in the groundwater phase at a contaminated site. The apparatus of this invention is configured to be used within an injection well of the type employed with known remediation techniques and enhances the biological treatment of soil contaminants in situ with microbes through achieving optimal levels of oxidizing agents within the soil. As such, the present invention is adapted to be employed in conjunction with conventional remediation systems to treat water-borne contaminants more efficiently. Importantly, the apparatus is also capable of delivering oxidizing agents in a manner that prevents or at least reduces the occurrence of biofouling of the injection and recovery wells.

40 Claims, 1 Drawing Sheet

APPARATUS FOR ENHANCED BIOREMEDIATION OF UNDERGROUND CONTAMINANTS

This is a continuation of application Ser. No. 08/542,605 filed on Oct. 13, 1995, now abandoned.

The present invention generally relates to an apparatus for in situ removal of dissolved or dispersed contaminants in the groundwater phase at a contaminated site. More particularly, this invention relates to such an apparatus and an aerobic bioremediation method made possible by the apparatus, wherein enhanced bioremediation is achieved by delivering an optimal amount of oxygen to the contaminated site in order to encourage microbial activity at the site.

BACKGROUND OF THE INVENTION

In view of the vital environmental implications, there is a continuing effort to identify and clean up sites contaminated with hazardous substances, with various methods and equipment having been proposed for this purpose. In the past, one known method has been to remove the contaminated soil and dispose of it elsewhere. However, the practical and remedial shortcomings of this approach are apparent, such that various other methods and equipment have been proposed to remediate such sites by chemically or biologically removing the contaminants in situ from the soil.

The type of remedial technique most suitable for a given contamination site is generally dependent on the state and type of the contaminant at a particular site. Aerobic biodegradation is a potentially effective approach to remediation of soil and groundwater contaminated by petroleum hydrocarbons and other degradable chemicals. Advantageously, remediation through biodegradation of such contaminants, also known as bioremediation, is suitable for the restoration of contamination sites created under numerous circumstances, including those caused by leaking underground storage tanks, industrial plant sites and similar widespread conditions that typically necessitate costly cleanups if remediated by other methods. Furthermore, aerobic biodegradation as a remediation technique is particularly attractive in view of its reliance on environmentally-sound natural processes. Specifically, bioremediation techniques utilize the enzyme-catalyzed metabolic processes of natural or genetically-engineered microbes to convert hydrocarbon and other carbon-based (organic) contaminants to harmless byproducts, including carbon dioxide and water.

An example of a bioremediation apparatus is represented in FIG. 1. As shown, the bioremediation technique entails removing dissolved and dispersed contaminants from a saturated soil zone 10 by directly pumping groundwater from a recovery well 12 that extends into the saturated soil zone 10, located below the water table 14. To exclude soil from the wells 12 and 22, each is equipped at its lower end with a screen 24 or other suitable structure. The groundwater with its dispersed and dissolved organic contaminants is drawn with a pump 16 to a mixing tank 18 prior to being returned to the saturated soil zone 10 through an injector 20 at the bottom of an injection well 22. Recirculation of the groundwater between the wells 12 and 22 through the soil zone 10 is continued until the microbe population in the soil zone 10 has completely biodegraded the contaminants within the soil.

Though bioremediation techniques have the previously-noted advantages, their successful implementation requires sufficient molecular oxygen or another suitable oxidizing agent to biodegrade the contaminants. As such, bioremediation processes require that air, oxygen or another oxidizing agent be added to the groundwater, typically at the mixing tank 18, immediately downstream of the pump 16, or at the injector 24. Generally, oxygen equaling about three and one-half times the hydrocarbon mass at a contamination site is required by most microbe species to completely bioremediate the site. Consequently, the speed with which such a large amount of oxygen is delivered to subsurface contaminants determines the ultimate efficiency of the bioremediation process and constitutes the greatest challenge in developing a cost effective aerobic bioremediation technology.

However, groundwater treated with air (about 20.9 volume percent oxygen) becomes saturated while only attaining an oxygen concentration of about nine milligrams per liter (mg/l) at standard conditions of 20° C. and one atmosphere. In comparison, groundwater treated with pure oxygen can have a dissolved oxygen (DO) concentration at saturation of about 50 mg/l at standard conditions. Due to the ability to achieve higher oxygen concentrations with pure oxygen, the prior art has proposed methods by which various forms of pure oxygen, including compressed oxygen gas, liquid oxygen, oxygen generated or separated from air, and oxygen from the decomposition of hydrogen peroxide, have been supplied to a subsurface contamination site in order to stimulate biodegradation of an organic contaminant. However, prior art delivery methods have generally been unable to supply sufficient oxygen to the groundwater for efficient in situ microbial biodegradation. Much of the oxygen supplied escapes as a gas into the upper soil region, or vadose zone 26, above the water table 14, and is eventually released to the atmosphere. Only a fraction of the oxygen is efficiently dissolved in the groundwater, and then in amounts insufficient to effectively bioremediate the contaminants.

Another problem associated with bioremediation techniques arises as a direct result of introducing oxygen into the saturated soil zone 10 to enhance the rate of biodegradation. Instead of moving freely within the groundwater into the recovery well 12, an increased oxygen supply within the saturated soil zone 10 often causes biofouling of the injection well's screen 24, characterized by a buildup of bacterial biomass and minerals, thus blocking flow out of the injection well 22. Such a result is a consequence of the oxygen being injected upstream of the screen 24 and is further due to the poor distribution of oxygen within the groundwater being injected into the soil zone 10.

From the above, it can be appreciated that in situ bioremediation of contaminated sites is a highly desirable remediation technique, but at the present is not efficient due to a lack of oxygen or other oxidizing agents for biodegradation process. Accordingly, it would be desirable if a method were available for promoting bioremediation of contaminated soil, through providing optimum oxidant levels with the contaminated soil, so as to maximize the microbial activity within the contaminated soil.

SUMMARY OF THE INVENTION

It is an object of this invention to provide a bioremediation process for biodegrading dissolved and dispersed organic contaminants in saturated subsurface soil regions.

It is another object of this invention that such a process enables optimal levels of an oxidizing agent to be achieved in groundwater within a saturated subsurface soil region in order to enhance bioremediation efficiencies.

It is still another object of this invention that the process is compatible with conventional remediation techniques, and therefore is able to enhance the efficiency of currently-installed systems can be enhanced.

It is yet another object of this invention that the process eliminates or avoids problems encountered in the prior art when introducing oxygen or other suitable oxidizing agents into subsurface soil regions to achieve enhanced bioremediation efficiencies.

It is a further object of this invention that such a process is made possible with an apparatus that can be deployed within existing subsurface remediation structures, so as to minimize the requirement for aboveground treatment equipment.

In accordance with a preferred embodiment of this invention, these and other objects and advantages are accomplished as follows.

According to the present invention, there are provided a method and apparatus for achieving in situ bioremediation of dissolved or dispersed organic contaminants in the groundwater phase at a contaminated site. The apparatus of this invention is configured to be used within an injection well of the type employed with known remediation techniques, and enhances the biological treatment of soil contaminants in situ with microbes through achieving optimal levels of oxidizing agents within the soil. As such, the present invention is adapted to be employed in conjunction with conventional remediation systems to treat water-borne contaminants more efficiently. Importantly, the apparatus is also capable of delivering oxidizing agents in a manner that prevents or at least reduces the occurrence of biofouling of the injection and recovery well screens.

The apparatus of this invention is used in conjunction with injection and recovery wells whose lower ends are disposed in a contaminated subsurface region below the local water table. As such, the subsurface region is saturated with groundwater, and the contaminants are either dissolved in the ground water or dispersed in a capillary zone between the saturated subsurface region and the unsaturated vadose, which lies between the water table and the surface. The lower end of each injection and recovery well is configured with a screen or other structure capable of permitting the flow of groundwater between the subsurface region and the well. As is conventional, the recovery well is adapted to recover groundwater from the saturated subsurface region, which is then cycled to the injection well for reintroduction into the subsurface region.

According to this invention, the apparatus is adapted to introduce under pressure an oxidizing agent, such as molecular oxygen, into the groundwater as a dispersion of molecules and at a rate such that the oxidizing agent is present in the groundwater flowing from the injection well at the solubility level for the particular oxidizing agent in the groundwater. The apparatus is preferably a gas-permeable, water-impermeable member through which the oxidizing agent passes into the groundwater, and furthermore is preferably disposed between the injection and recovery wells such that the oxidizing agent is introduced directly into the groundwater while within the subsurface region. A preferred placement for the apparatus is adjacent the injection well in the subsurface region, but outside the well so as to be located within the groundwater immediately downstream of the injection well. As such, the injection well is less susceptible to biofouling, by which a buildup of bacterial biomass and minerals occurs to the extent that flow from the injection well can become blocked.

In addition to the above, this invention encompasses further measures to reduce the occurrence of biofouling. For example, the recovery well is also preferably designed to be resistant to biofouling, and the equipment used to recycle the groundwater between the wells is preferably adapted to remove minerals from the groundwater prior to being returned to the injection well.

From the above description, it can be seen that the apparatus of this invention makes possible a novel method for removing contaminants from a subsurface region of the earth. Generally, a key step of the method is introducing the oxidizing agent into the groundwater in a manner that results in the oxidizing agent being present as a dispersion of molecules, as opposed to gas bubbles generated by prior an methods. In addition, this step entails introducing the oxidizing agent at a rate that results in the oxidizing agent being present within the groundwater at or near its solubility level. In effect, the present invention operates to disperse an optimal soluble amount of an oxidizing agent in very small portions into the groundwater, thereby maximizing the oxygen concentration and dissolution rate. As the groundwater travels through the contaminated soil toward the recovery wells, the oxidizing agent will be removed from solution by native soil bacteria that have adapted to degrade and live on the organic carbon of the contaminants, resulting in the oxidation of these compounds to yield harmless byproducts including carbon dioxide and water.

Accordingly, a significant advantage of this invention is that it enables dissolved and dispersed contaminants present within a saturated subsurface region to be more efficiently biodegraded in situ, resulting in a byproduct that can safely remain in the subsurface region or be removed from the reactor and safely discharged to the atmosphere. Furthermore, the apparatus is operable to maintain a healthy microbial population within the subsurface region by enabling the introduction of microbial nutrients and other beneficial substances into the groundwater, while avoiding the occurrence of biofouling and microbe bloom that can interfere with the biodegradation process and equipment.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
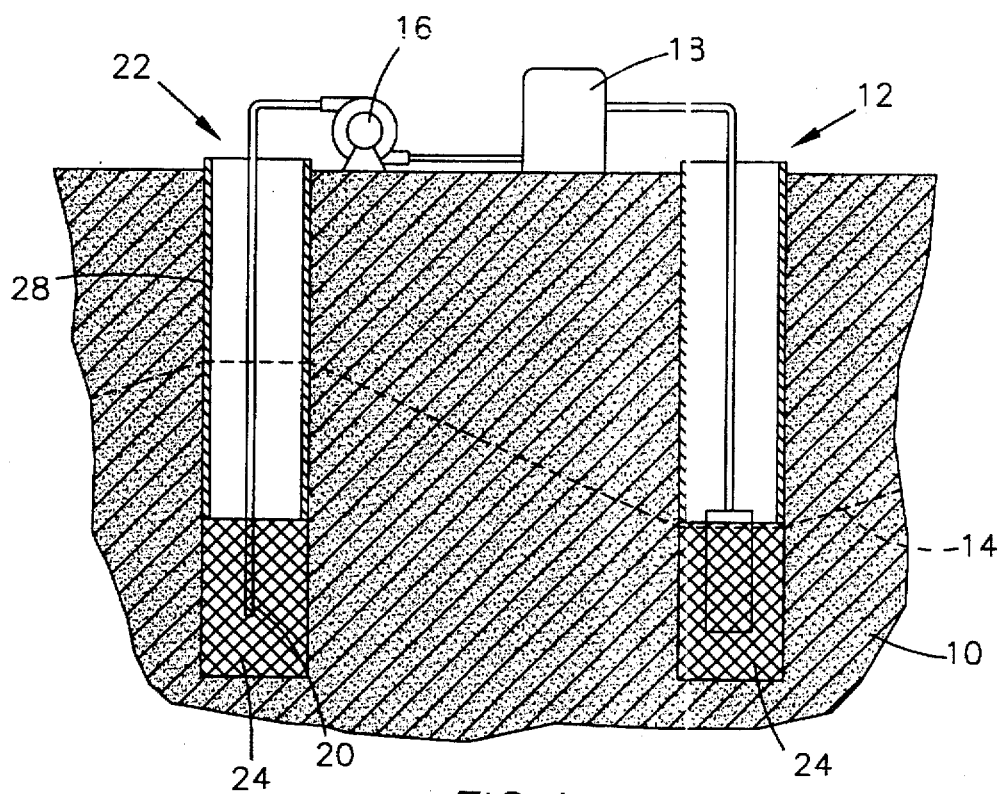
FIG. 1 shows in cross-section a bioremediation system in accordance with the prior art.

As previously described, FIG. 1 depicts a bioremediation system of a type known in the art. The present invention entails the use of an apparatus 26, shown in FIG. 2, that can be retrofitted to the system of FIG. 1 to achieve an enhanced bioremediation process. Accordingly, the following discussion pertaining to this invention will make reference to FIG. 1 and employ the same reference numerals to identify the same or similar structures and features. While specific constructions and configurations for the remediation system and the apparatus 26 are depicted, those skilled in the art will recognize that other construction and configurations could be employed, all of which are within the scope of this invention.

As with the bioremediation system of FIG. 1, the apparatus 26 of the present invention is adapted to introduce an oxidizing agent into the groundwater at a contamination site in order to biodegrade organic contaminants dissolved or dispersed within a subsurface soil zone 10 that is saturated by the groundwater. A preferred oxidizing agent is oxygen gas, though other gas-phase oxidizing agents known in the art could be used.

Figure 2:
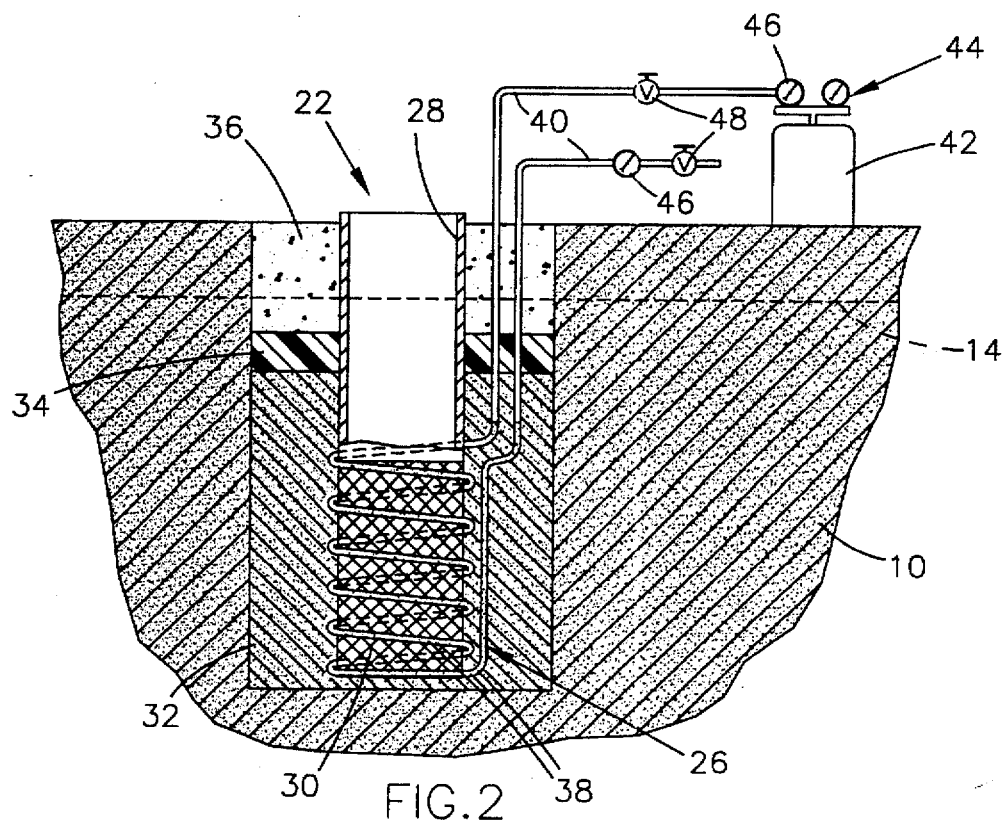
FIG. 2 shows in cross-section an injection well modified with an apparatus for diffusing an oxidizing agent into groundwater in accordance with a preferred embodiment of this invention.

With reference to FIGS. 1 and 2, an injection well 22 is depicted as being located in a saturated soil region 10 containing a dissolved biodegradable organic contaminant, such as gasoline. The injection well 22 is shown to include a well casing 28 into which an injector 20 (not depicted in FIG. 2 for clarity) projects for reintroducing groundwater into the soil zone 10. As is known in the art, the well casing 14 can be of any suitable construction and diameter, with the depth of the well casing 14 being dependent on the location of the contamination region beneath the surface of the earth. The lower end of the well casing 14 is generally equipped with a screen 30 or other suitable structure capable of excluding soil and other relatively large solid particles from the well 22, while freely permitting release of the groundwater into the soil region 10. Furthermore, a coarse gravel or sand pack 32 surrounds the lower end and screen 30 of the injection well 22 in order to promote the dispersion of the groundwater into the soil zone 10. This pack 32 is preferably capped with a suitable well sealant material 34, such as bentonite, followed by a cement cap 36, which cooperate to prevent the escape of the oxidizing agent into the atmosphere through the pack 32.

As shown in FIG. 2, an embodiment of the apparatus 26 of this invention includes coils of diffusion tubing 38 that are loosely wrapped around the screen 30 of the injection well 22, such that both the well 22 and tubing 38 are disposed within the pack 32 and the saturated subsurface soil zone 10. Suitable known materials for the tubing 38 include rubber and other polymeric materials capable of being formed to have walls that are permeable to gas molecules. As such, the apparatus 26 is adapted to achieve a bubbleless injection process by which the oxidizing agent diffuses as discrete molecules into the groundwater within the soil zone 10.

The remainder of the apparatus 26 shown in FIG. 2 is generally composed of gas-impermeable tubing 40, such as metal tubing, a source tank 42 for the oxidizing agent, a two-stage regulator 44, pressure gauges 46 and valves 48 for monitoring and controlling the flow of oxidizing agent into the groundwater. The regulator 44, gauges 46 and valves 48 serve to regulate the pressure at which the oxidizing agent is delivered to the tubing 38 in order to control the rate at which the oxidizing agent diffuses into the groundwater. The regulator 44 may be of any suitable type that can be calibrated within the desired pressure range in order to efficiently control the rate of flow from the tank 42. The pressure gauge 46 shown as part of the regulator 44 displays the total remaining oxidizing agent within the tank 42 and can be used to monitor the mass addition rate. As illustrated, the apparatus 26 can be controlled manually, though it is readily adapted for automatic control if the regulator 44, gauges 46 and valves 48 are replaced with electronic sensors and valves.

When ejected from the well 22, the groundwater must pass between the coils of the tubing 38, enabling molecules of the oxidizing agent to become individually dissolved in the groundwater as they diffuse through the walls of the tubing 38. By appropriately adjusting the pressure within the tubing 38, the oxidizing agent diffuses through the tubing 38 at a rate sufficient to saturate or nearly saturate the groundwater as the groundwater enters the contaminated soil. Thereafter, the groundwater flows through the soil zone 10 toward a recovery well 12 (FIG. 1), which is strategically placed at the contamination site pursuant to known practices in the art. As the groundwater flows toward the recovery well 12, the oxidizing agent is removed from solution by native soil microbes that have adapted to degrade and live on the organic carbon of the contaminants within the soil zone 10. The oxidizing agent is used by the microbes to oxidize the organic contaminants to yield harmless byproducts, including carbon dioxide and water.

If desired, the tubing 38 could be installed upstream of the screen 30 within the injection well 22, although an increased potential for clogging or biofouling the well screen 30 would result. According to this invention, releasing the oxidizing agent along the exterior of the well screen 30 is preferred in order to avoid stimulation of bacterial growth and biofouling within the openings of the screen 30 due to the optimal level of oxidizing agent, and therefore microbial activity, in the groundwater introduced by the injection well 22. As shown, the tubing 38 is disposed in the pack 32 and wrapped around the perimeter of the screen 30, though the tubing 38 could be positioned to have any suitable loose configuration in order to optimize the diffusion of the oxidizing agent molecules into the groundwater. Alternatively, the tubing 38 could be installed elsewhere within the pack 32 or in trenches further downstream of the injection well 22.

An important aspect of the invention is the ability to further reduce the occurrence of biofouling of the recovery and injection wells 12 and 22. Specifically, in addition to introducing the oxidizing agent downstream of the well screen 30, this invention encompasses several additional methods of preventing or minimizing biofouling that can clog the well screens 30 and the surrounding pack 32 and soil. One technique is to construct the well screens 30 from copper or copper alloys such as brass and bronze, or to coat the screens 30 with a copper or copper alloy material. Copper and copper-containing materials are known to resist attachment and growth of microorganisms, such that forming the screens 30 from a copper-containing material will prevent direct growth of microbial colonies, including slime-forming bacteria, on the screens 30.

Another approach to reducing the incidence of biofouling is to decrease the amount of minerals within the groundwater. As is known, a majority of biofouling deposits usually consist of mineral substances precipitated from the groundwater and trapped within a web of biomass. These deposits can be reduced or prevented by pretreating the groundwater before injection to remove minerals such as iron, calcium and magnesium. Suitable commercial technologies for this purpose include cation exchange of all three minerals or an aeration and filtering process that removes only iron. A convenient location for this process is within the mixing tank 18 shown in FIG. 1. Because oxidation processes are known to form insoluble ferric compounds from soluble ferrous iron compounds and to precipitate iron hydroxides, all of which significantly promote well clogging, the preferred practice of introducing the oxidizing agent to the groundwater downstream of the well screen 30 also serves to minimize the incidence of biofouling in the well area.

In view of the above, it can be appreciated that this invention enables optimal remediation conditions to be attained at a contaminated site by accurately controlling the rate at which the oxidizing agent is introduced into the groundwater, by finely dispersing the oxidizing agent as discrete molecules of gas into the flow of groundwater to efficiently supply dissolved oxidizing agent to a contaminated soil region, and by reducing the likelihood of biofouling that would otherwise occur due to the high level of oxidizing agent in the groundwater. The dissolution of the oxidizing agent is efficient because the oxidizing agent molecules are slowly released through a large surface area in intimate contact with the flowing groundwater.

With particular reference to oxygen as the oxidizing agent, it is well known that the rate of oxygen diffusion from the tubing 38 and into the groundwater is a function of the differential between the oxygen gas pressure ($P_g$) in the tubing and the pressure ($P_m$) in the groundwater. The diffusion rate is also a function of the material, wall thickness and surface area of the tubing 38. The characteristic diffusion rate (D) per foot of tubing 38 can be measured in the laboratory and used to calculate the applied oxygen pressure needed to deliver sufficient oxygen to the groundwater in order to attain the maximum solubility value (S) for oxygen in the groundwater —generally, about 50 mg/l at standard conditions of 20° C. and one atmosphere—for the desired groundwater injection rate (Q).

The targeted rate of oxygen addition can then be estimated by multiplying the water injection rate (Q) times the maximum solubility value (S) of oxygen. As is well known, maximum solubility decreases with increasing water temperature and increases with increasing hydrostatic pressure, such that adjustments may be necessary when calculating the targeted rate of oxygen addition. The desired or optimum groundwater injection rate (Q) can be estimated after determining the hydrogeologic characteristics of the individual contaminated site and mathematically modeling the flow of groundwater needed to deliver the oxygen and nutrients to the subsurface soil zone 10 of contamination. The actual rate of oxygen addition can be adjusted by the pressure regulator 44, as indicated in FIG. 2, or another suitable device.

Alternatively, the optimum rate of oxygen addition can be determined empirically by adjusting the oxygen gas pressure until the desired optimum level of dissolved oxygen is achieved in the subsurface soil zone 10 as evidenced by measurements made in monitoring wells (not shown) placed downstream of the injection well 22. In addition, increases in free oxygen gas may be detected by monitoring soil gas near the injection well 22. Such free oxygen represents undissolved oxygen lost from the injection process, and therefore indicates that the injection rate and gas pressure are exceeding the optimum level.

In practice, a number of recovery and injection wells 12 and 22 will typically be used to remediate a contamination site, with each well appropriately positioned to form an array of wells, or well field. A suitable well field might include a row of injection wells 22 on one side of the contaminated site, and a row of recovery wells 12 on the opposite side of the site, in a manner represented by FIG. 1. In accordance with this invention, the well screens 30 of the injection wells 22 are preferably constructed of copper or a copper alloy to prevent the growth of biofilms of bacteria on their surfaces, which would otherwise lead to biofouling and plugging of the screens 30.

The operation of the apparatus 26 of this invention for use within a bioremediation system of a type shown in FIG. 1 will be described below in reference to the bioremediation of a hypothetical contamination site having a water table at nine feet and contaminated by 50 gallons of unleaded fuel. The contaminant will be presumed to exist according to the following vertical distribution: 40 percent as residual gasoline microdroplets in the unsaturated (vadose) zone at a depth of two to eight feet; 50 percent as dispersed gasoline microdroplets mixed with groundwater in the capillary zone at a depth of eight to nine feet (immediately above the water table 14); and 10 percent as dissolved gasoline components in the groundwater within the saturated zone 10 at a depth of nine to twelve feet. The preferred effective oxidizing agent for microbial oxidation processes under such subsurface conditions is molecular oxygen ($O_2$).

The above contaminated zones can be remediated by the following technologies. The residual gasoline in the unsaturated zone can be remediated by known technologies such as vapor extraction and bioventing, which are not necessary to the function of the apparatus 26, but can be used simultaneously with this invention. Remediation by vapor extraction and bioventing is done by drawing air or injecting air into the vadose zone. This additional air diffuses downward very slowly to deeper zones and, therefore, is not effective in stimulating biodegradation in the capillary and saturated zones. Using an injection well 22 equipped with the apparatus 26 of this invention, the bulk of the dispersed and dissolved gasoline (30 gallons) mixed with groundwater in the capillary and saturated zones can be remediated by using subsurface microbes to biodegrade the gasoline hydrocarbons.

Based on an analytical evaluation of the oxidation process utilizing oxygen gas as the oxidizing agent, at least about 612 pounds of oxygen must be supplied to the microbes within the contaminated soil region in order to biodegrade the gasoline to carbon dioxide and water. The above-described remediation system incorporating the apparatus 26 of this invention can be operated as follows to bioremediate the capillary and saturated zones.

Groundwater is pumped from the recovery wells 12 and mixed with nutrients including, for example, about ten mg/l ammonium chloride and about one mg/l sodium phosphate buffer (pH 7). The extracted groundwater from the recovery wells 12 is then treated by passage through the mixing tank 18 or a commercial water treatment system to remove metal ions, including iron, calcium and magnesium, to levels of preferably below about 100 parts per billion (ppb) each, so as to reduce the potential for well scaling and plugging and to reduce the potential for clogging the soil pores through which the treated groundwater will be recirculated. The nutrient-supplemented groundwater is returned to the contamination site by simultaneous injection through the injection wells 22, whose injectors 20 are preferably disposed at a depth of about seven to twelve feet.

According to this invention, oxygen at a pressure of between about 50 and about 100 psig is injected through the tubing 38, such that a maximum attainable oxygen concentration of about 50 mg/l at about 20° C., up to about 65 mg/l at about 10° C., is achieved, depending upon the natural groundwater temperature. As a result of the construction of the apparatus 26, the now highly oxygen-rich and nutrient-rich groundwater flows freely from the injection wells 22 through the capillary and saturated soil zones, while the other remediation methods are used to treat the vadose zone as described above. Because the oxygen is present within the groundwater at or very near its maximum solubility level as a result of the operation of the apparatus 26, the time required to completely bioremediate the contamination site is reduced to a minimum, thereby reducing the overall cost of the remediation operation.

From the above, it can be appreciated that a significant advantage of this invention is that the apparatus 26 makes possible a highly practical in situ treatment method by which contaminated sites can be bioremediated with microbes. In particular, the apparatus of this invention enables improved control and efficiency of the bioremediation process, in that an oxidizing agent can be delivered in sufficient amounts and at a sufficient rate to attain maximum solubility for the oxidizing agent within the groundwater being treated. Accordingly, this invention overcomes the prior art difficulty of rapidly delivering a large mount of oxidizing agent to subsurface contaminants and therefore yields a more efficient and cost-effective bioremediation process than was previously possible.

Another advantage attributable to the apparatus 26 of this invention is that, because the biodegradation reaction occurs below ground, the present invention avoids the requirement for extensive aboveground treatment equipment necessitated by conventional non-biological remediation techniques. These advantages significantly minimize the cost to remediate a contaminated site as a result of lower capital investment, fees and maintenance costs.

Finally, an important aspect of this invention is the ability to reduce the likelihood of biofouling of the apparatus 26 that would otherwise occur due to the high level of oxidizing agent in the groundwater. Specifically, the tubing 38, screens 30 and other equipment required to recirculate groundwater through a subsurface soil region are highly prone to biofouling due to the heightened microbial activity enabled by the apparatus 26 of this invention. Consequently, this invention encompasses techniques for achieving a healthy microbial population within a subsurface soil region by enabling the introduction of an oxidizing agent, microbial nutrients and other beneficial substances into the groundwater, while also reducing or eliminating the occurrence of biofouling and microbe bloom that would otherwise occur and interfere with the biodegradation process and equipment.

While this invention has been described in terms of a preferred embodiment, it is apparent that other forms could be adopted by one skilled in the art. For example, the construction of the wells 12 and 22 and the apparatus 26 could differ significantly from that shown, including the use of conventional wells without special injection or pumping equipment, and materials other than those noted could be employed. Accordingly, the scope of this invention is to be limited only by the following claims.

What is claimed:

1. An apparatus for use in biodegrading a contaminant in groundwater within a surface region of earth, the apparatus comprising:
   a first well having a lower end disposed in the subsurface region;
   means disposed at the lower end of the first well for permitting flow of groundwater from the first well into the subsurface region;
   a second well having a lower end disposed in the subsurface region;
   means disposed at the lower end of the second well for permitting entry of groundwater into the second well from the subsurface region;
   means for introducing under pressure an oxidizing agent into the groundwater as a dispersion of molecules and at a rate such that the oxidizing agent is present in the groundwater flowing from the first well at a soluble level for the oxidizing agent in the groundwater; and
   means for inhibiting biofouling of the apparatus.

2. An apparatus as recited in claim 1 wherein the oxidizing agent is molecular oxygen.

3. An apparatus as recited in claim 1 wherein the introducing means comprises a gas-permeable member through which the oxidizing agent passes into the groundwater.

4. An apparatus as recited in claim 1 further comprising means for maintaining the oxidizing agent within the introducing means at a controlled pressure.

5. An apparatus as recited in claim 1 wherein the introducing means is disposed between the first and second wells such that the oxidizing agent is introduced into the subsurface region.

6. An apparatus as recited in claim 1 wherein the introducing means is disposed adjacent the first well in the subsurface region.

7. An apparatus as recited in claim 1 further comprising a water-permeable bed in which the lower end of the first well is embedded.

8. An apparatus as recited in claim 1 wherein the entry means of the second well is formed from a material resistant to biofouling by microorganisms.

9. An apparatus as recited in claim 1 further comprising means for recycling groundwater from the second well to the first well.

10. An apparatus as recited in claim 1 wherein the inhibiting means comprises means for removing minerals from the groundwater prior to the groundwater being returned to the first well.

11. An apparatus for use in biodegrading a contaminant in groundwater within a subsurface region of earth, the apparatus comprising:
    an injection well having a lower end disposed in the subsurface region;
    means disposed at the lower end of the injection well for permitting flow of groundwater from the injection well into the subsurface region;
    a recovery well having a lower end disposed in the subsurface region;
    means disposed at the lower end of the recovery well for permitting entry of groundwater into the recovery well from the subsurface region;
    means for recycling groundwater from the recovery well to the injection well;
    means disposed between the injection and recovery wells for introducing under pressure molecular oxygen into the groundwater as a dispersion of molecules and at a rate such that oxygen is present in the groundwater flowing from the injection well approximately at a maximum solubility level for oxygen in the groundwater;
    means for maintaining oxygen within the introducing means at the pressure; and
    means for inhibiting biofouling of the apparatus.

12. An apparatus as recited in claim 11 wherein the introducing means comprises a gas-permeable conduit through which oxygen passes into the groundwater.

13. An apparatus as recited in claim 11 wherein the introducing means circumscribes the injection well in the subsurface region.

14. An apparatus as recited in claim 11 further comprising a water-permeable bed in which the lower end of the injection well is embedded.

15. An apparatus as recited in claim 11 wherein the entry means of the recovery well is formed from a material resistant to biofouling by microorganisms.

16. An apparatus as recited in claim 11 wherein the inhibiting means comprises means for removing minerals from the groundwater prior to the groundwater being returned to the injection well.

17. A method for biodegrading a contaminant in groundwater within a subsurface region of earth, the method comprising the steps of:

providing a first well having a lower end disposed in the subsurface region;

providing a second well having a lower end disposed in the subsurface region a distance from the lower end of the first well;

introducing groundwater from the lower end of the first well into the subsurface region;

introducing under pressure an oxidizing agent into the groundwater introduced by the first well, the oxidizing agent being introduced into the groundwater as a dispersion of molecules and at a rate such that the oxidizing agent is present in the groundwater within the subsurface region approximately at a maximum solubility level for the oxidizing agent in the groundwater;

recovering the groundwater from the subsurface region in the lower end of the second well;

recycling groundwater from the second well to the first well; and inhibiting biofouling of the apparatus.

18. A method as recited in claim 17 wherein the oxidizing agent is introduced adjacent the first well.

19. A method as recited in claim 17 wherein the recycling step includes removing minerals from the groundwater prior to the groundwater being returned to the first well.

20. A method as recited in claim 17 wherein the oxidizing agent is molecular oxygen.

21. An apparatus for use in biodegrading a contaminant in groundwater within a subsurface region of earth, the apparatus comprising:

permeable passage means for introducing under pressure an oxidizing agent into groundwater as a dispersion of molecules; and means for regulating the introduction of the oxidizing agent into the groundwater at a rate at which the oxidizing agent is present in the groundwater approximately at a soluble level for the oxidizing agent in the groundwater.

22. An apparatus as recited in claim 21 wherein the passage means is adapted to introduce molecular oxygen under pressure into the groundwater.

23. An apparatus as recited in claim 21 wherein the passage means comprises a gas-permeable diffusion tube.

24. An apparatus as recited in claim 21 wherein the regulating means is operable to maintain the oxidizing agent within the passage means at a controlled pressure.

25. An apparatus as recited in claim 21 further comprising means for inhibiting biofouling of the apparatus.

26. An apparatus as recited in claim 21 further comprising means for injecting groundwater into a subsurface region, the passage means being disposed exteriorly of the injecting means.

27. An apparatus as recited in claim 26 further comprising a water-permeable bed in which the injecting means and the passage means are embedded.

28. An apparatus as recited in claim 26 further comprising means for drawing groundwater from the subsurface region.

29. An apparatus as recited in claim 28 wherein the drawing means is formed from a material resistant to biofouling by microorganisms.

30. An apparatus as recited in claim 28 further comprising means for recycling groundwater from the drawing means to the injecting means.

31. An apparatus as recited in claim 30 wherein the recycling means comprises means for removing minerals from the groundwater prior to the groundwater being delivered to the injecting means.

32. An apparatus for use in biodegrading a contaminant in groundwater within a subsurface region of earth, the apparatus comprising:

a well casing adapted to permit passage of groundwater into a subsurface region;

a screen surrounding at least a portion of the well casing;

a diffusion tube surrounding the screen and well casing, the diffusion tube being adapted to introduce under pressure an oxidizing agent into the groundwater as a dispersion of molecules; and means for regulating the introduction of the oxidizing agent into the groundwater at a rate at which that the oxidizing agent is present in the groundwater approximately at a soluble level for the oxidizing agent in the groundwater.

33. An apparatus as recited in claim 32 wherein the diffusion tube is adapted to introduce oxygen gas under pressure into the groundwater.

34. An apparatus as recited in claim 32 wherein the regulating means is operable to maintain the oxidizing agent within the diffusion tube at a controlled pressure.

35. An apparatus as recited in claim 32 further comprising means for inhibiting biofouling of the well casing and screen.

36. An apparatus as recited in claim 32 further comprising a reservoir for the oxidizing agent, the reservoir being connected to the regulating means.

37. An apparatus as recited in claim 32 further comprising a water-permeable bed in which the well casing and the diffusion tube are embedded.

38. An apparatus as recited in claim 32 further comprising means for delivering groundwater to the well casing.

39. An apparatus as recited in claim 38 wherein the delivering means comprises a pump and a mixing tank, the mixing tank comprising means for removing minerals from the groundwater prior to the groundwater being delivered to the well casing.

40. An apparatus as recited in claim 39 wherein the delivering means further comprises means for drawing groundwater from the subsurface region to the mixing tank and means for injecting groundwater into the well casing.

* * * * *